(12) United States Patent
Jeon et al.

(10) Patent No.: US 12,334,564 B2
(45) Date of Patent: Jun. 17, 2025

(54) ELECTRODE BASED ON MONOLITHIC AND ORDERED THREE-DIMENSIONAL POROUS NANOSTRUCTURE WITH ORGANIC ACTIVE MATERIAL, METHOD OF MANUFACTURING THE SAME, AND SECONDARY BATTERY INCLUDING THE SAME

(71) Applicant: KOREA ADVANCED INSTITUTE OF SCIENCE AND TECHNOLOGY, Daejeon (KR)

(72) Inventors: Seokwoo Jeon, Daejeon (KR); Youngjin Ham, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 622 days.

(21) Appl. No.: 17/729,773

(22) Filed: Apr. 26, 2022

(65) Prior Publication Data

US 2023/0170493 A1    Jun. 1, 2023

(30) Foreign Application Priority Data

Dec. 1, 2021    (KR) .................. 10-2021-0170224

(51) Int. Cl.
| | | |
|---|---|---|
| H01M 4/80 | (2006.01) | |
| H01M 4/04 | (2006.01) | |
| H01M 4/139 | (2010.01) | |
| H01M 4/60 | (2006.01) | |
| H01M 4/62 | (2006.01) | |
| H01M 4/02 | (2006.01) | |

(52) U.S. Cl.
CPC ........... *H01M 4/80* (2013.01); *H01M 4/0428* (2013.01); *H01M 4/0438* (2013.01); *H01M 4/139* (2013.01); *H01M 4/60* (2013.01); *H01M 4/624* (2013.01); *H01M 4/625* (2013.01); *H01M 4/626* (2013.01); *H01M 2004/021* (2013.01)

(58) Field of Classification Search
CPC .... H01M 4/80; H01M 4/0428; H01M 4/0438; H01M 4/139; H01M 4/60; H01M 4/624; H01M 4/625; H01M 4/626
See application file for complete search history.

(56) References Cited

FOREIGN PATENT DOCUMENTS

| | | |
|---|---|---|
| KR | 10-2006-0109477 | 10/2006 |
| KR | 10-2018-0028625 | 3/2018 |
| KR | 10-2018-0072473 | 6/2018 |

OTHER PUBLICATIONS

Machine Translation of Korean Patent Publication No. 20180072473 (Year: 2018).*

(Continued)

*Primary Examiner* — Wyatt P McConnell
(74) *Attorney, Agent, or Firm* — Womble Bond Dickinson (US) LLP

(57) ABSTRACT

An ordered porous nano-network electrode includes a conductive three-dimensional structure having ordered and interconnected pores, and an active layer disposed on a surface of the conductive three-dimensional structure to surround the pores and including an organic active material having a redox center. An amount of the organic active material in a unit area is 0.1 mg/cm$^2$ to 30 mg/cm$^2$.

14 Claims, 9 Drawing Sheets

(56) References Cited

OTHER PUBLICATIONS

Ham, Y. et al., "3D periodic polyimide nano-networks for ultrahigh-rate and sustainable energy storage", This journal of Royal Society of Chemistry 2021, Aug. 6, 2021.
Ryu, J. et al., "Three-Dimensional Monolithic Organic Battery Electrodes," ACS Nano, 2019, 13, pp. 14357-14367.
Zhang, H. et al., "Three-dimensional bicontinuous ultrafast-charge and -discharge bulk battery electrodes," Nature Nanotechnology, 2011, 6, 277.
Jeon, S. et al., "Fabricating complex three-dimensional nanostructures with high-resolution conformable phase masks," Proceedings of the National Academy of Sciences of the United States of America, 2004, vol. 101 (34), pp. 12428-12433.

\* cited by examiner

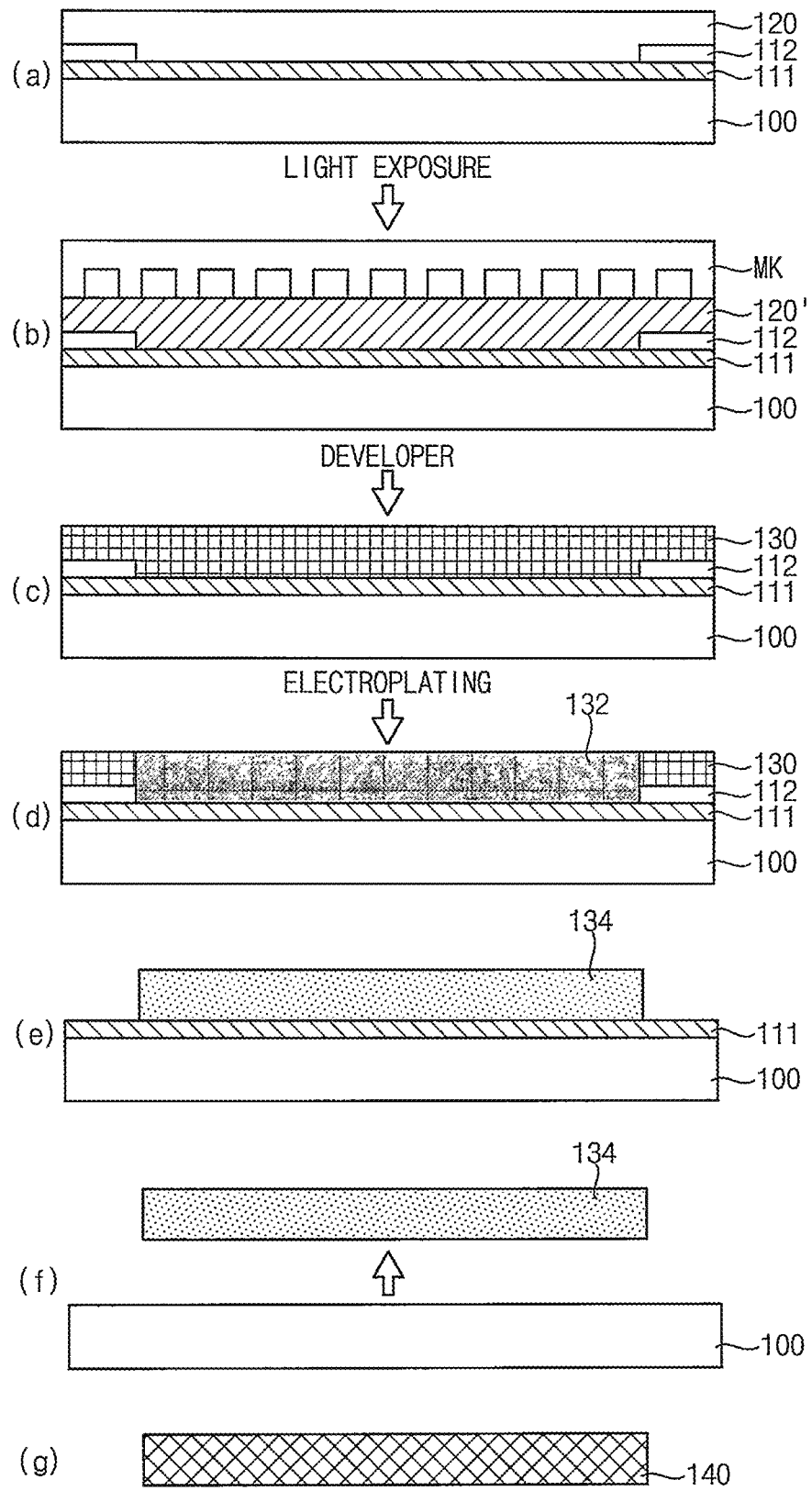

ELECTRODE BASED ON MONOLITHIC AND ORDERED THREE-DIMENSIONAL POROUS NANOSTRUCTURE WITH ORGANIC ACTIVE MATERIAL, METHOD OF MANUFACTURING THE SAME, AND SECONDARY BATTERY INCLUDING THE SAME

CROSS-REFERENCE TO RELATED APPLICATION

This application claims priority to and benefits of Korean Patent Application No. 10-2021-0170224 under 35 U.S.C. § 119 filed on Dec. 1, 2021 in the Korean Intellectual Property Office, the entire contents of which are incorporated herein by reference.

BACKGROUND

1. Technical Field

The invention relates to an electrode for a battery. More particularly, the invention relates to an ordered three-dimensional porous nano-network electrode, a method of manufacturing the electrode and a secondary battery including the electrode.

2. Description of the Related Art

Recently, demand for a sustainable energy storage device is increasing for electric vehicles and portable electronic devices. A secondary battery is one of the most currently-used energy storage systems. An electrode of a conventional secondary battery uses a metal-based material. However, the conventional secondary battery using a metal-based electrode material may hardly achieve a high energy density and may cause problems of resources, costs and environments. Therefore, in view of technology, economy and environments, efforts to replace the metal-based electrode material with an organic material are being made. An organic material is naturally abundant and may reduce a weight of an electrode.

However, a conventional organic-based electrode material needs a conductive additive with a high content to overcome a low electric conductivity of an organic material. Thus, it is limited to increase an energy density of a secondary battery. Furthermore, even though an organic-based electrode theoretically has a high capacitance, a conventional organic-based electrode practically shows a much less capacitance than a theoretic capacitance due to a non-ordered electrode structure, which inhibits electrochemical activity thereof. Thus, in order to overcome the above limitations thereby maximizing electrochemical activity of an organic-based electrode, a novel electrode structure for an organic-based energy storage material, which can provide a large reaction surface, move electrons quickly and reduce diffusion resistance of ions, is necessary. Furthermore, a reproducible technology for fabricating electrodes is also necessary so that an organic-based electrode may be practically used and commercialized with a rapid charge-discharge characteristic, a high electrochemical activation and a high reliability.

SUMMARY

One object of the invention is to provide an ordered three-dimensional porous nano-network electrode that includes an organic material having redox activity and allows electrons and ions to quickly move therein thereby maximizing electrochemical activity of an active material.

Another object of the invention is to provide a method of manufacturing the ordered three-dimensional porous nano-network electrode.

Another object of the invention is to provide a secondary battery having a high energy density and superior cycle characteristics, and being quickly charged and discharged.

According to an embodiment of the invention, an ordered porous nano-network electrode includes a conductive three-dimensional structure having ordered and interconnected pores, and an active layer disposed on a surface of the conductive three-dimensional structure to surround the pores and including an organic active material having a redox center. An amount of the organic active material in a unit area is 0.1 mg/cm$^2$ to 30 mg/cm$^2$.

In an embodiment, the conductive three-dimensional structure has a porosity of 40% to about 95% and a nano-shell shape with a shell thickness of 20 nm to 200 nm, and is sandwiched between adjacent active layers.

In an embodiment, the conductive three-dimensional structure includes at least one of Ni, Cu, SUS (stainless steel), Ti, V, Cr, Mn, Fe, Co, Zn, Mo, W, Ag, Au, Ru, Pt, Ir, Al, Sn, Bi and Sb.

In an embodiment, the conductive three-dimensional structure includes at least one of titanium nitride (TiN), zinc oxide (ZnO), indium oxide (In$_2$O$_3$) and aluminum-doped zinc oxide (AZO).

In an embodiment, the conductive three-dimensional structure includes a conductive carbon-based material.

In an embodiment, the organic active material includes a heterocyclic compound having at least one six-atoms ring or five-atoms ring, which includes at least one of carbon, oxygen, nitrogen and sulfur.

In an embodiment, at least one hydrogen atom of the heterocyclic compound is replaced with at least one substituent selected from an alkyl group, an alkoxyl group, a hydroxyl group, a carbonyl group, a cyan group, an amine group, a halogen atom and a halogenated alkyl group.

In an embodiment, a thickness of the conductive three-dimensional structure is 5 μm to 15 μm, and an amount of the organic active material in a unit area is 2 mg/cm$^2$ to 5 mg/cm$^2$.

In an embodiment, an amount of the organic active material is 45 wt % to 55 wt % based on a total weight of the nano-network electrode.

According to an embodiment of the invention, a method of manufacturing an ordered porous nano-network electrode. The method includes forming a three-dimensional porous polymer template having ordered and interconnected pores on a substrate, providing a conductive material in the pores of the three-dimensional porous polymer template, removing the three-dimensional porous polymer template to form a conductive three-dimensional structure having an inverse shape of the three-dimensional porous polymer template, which is formed from filling the pores, or a nano-shell structure, removing the substrate from the conductive three-dimensional structure, and forming an active layer on a surface of the conductive three-dimensional structure. The active layer includes an organic active material having a redox center.

According to an embodiment of the invention, a secondary battery includes a first electrode including the ordered porous nano-network electrode, a second electrode separated from the first electrode by a separator, and an electrolyte transferring ions between the first electrode and the second electrode.

According to example embodiments of the invention, an ordered porous nano-network electrode includes an organic material having stable redox activity. Furthermore, the ordered porous nano-network electrode has a high electron mobility and ionic mobility thereby maximizing electrochemical activity of an active material.

In the ordered porous nano-network electrode, nano-scaled active material may be uniformly distributed to surround a conductive structure having ordered and interconnected pores. Thus, an electric conductivity and an ionic conductivity may be increased thereby achieving a high capacity close to an intrinsic capacity. Thus, a secondary battery having a high energy density and cycle characteristics and being easily charged and discharged may be provided.

The ordered porous nano-network electrode may be manufactured by using various organic active materials thereby providing a base technology for application and commercialization of environmental and sustainable organic electrode materials.

BRIEF DESCRIPTION OF THE DRAWINGS

FIG. 1 shows cross-sectional views illustrating a method for manufacturing a nano-network electrode according to an embodiment of the present invention.

DETAILED DESCRIPTION OF THE EMBODIMENTS

Figure 2A:
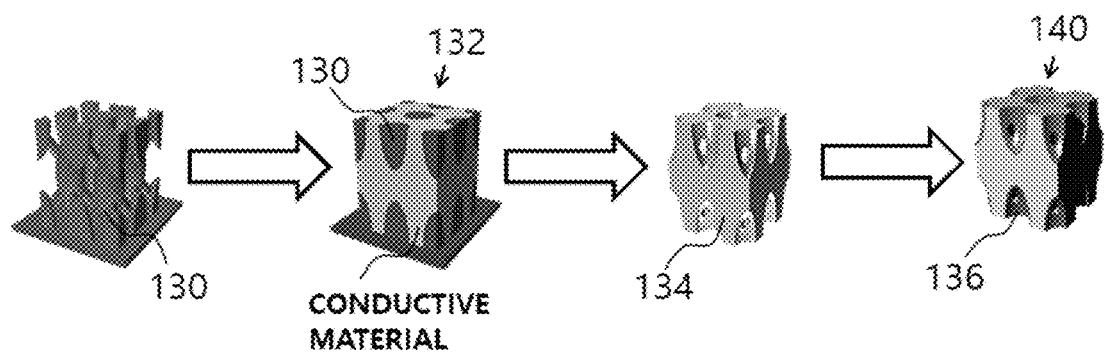
FIG. 2A shows schematic views illustrating forming a conductive three-dimensional structure having an inverse shape of a porous template and forming an organic active layer on a surface of the conductive three-dimensional structure in a method for manufacturing a nano-network electrode according to an embodiment of the present invention.

Various embodiments will be described more fully hereinafter with reference to the accompanying drawings, in which some embodiments are shown. The invention may, however, be embodied in many different forms and should not be construed as limited to the embodiments set forth herein. Rather, these embodiments are provided so that this description will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include a plurality of forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2B:
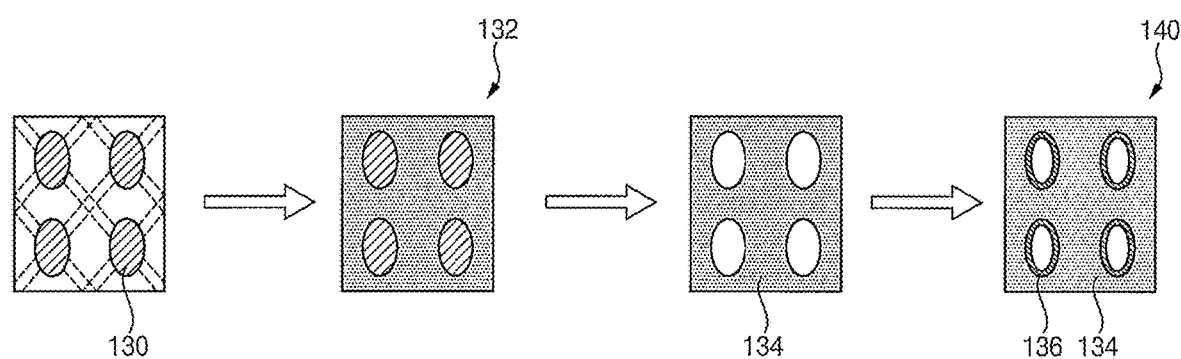
FIG. 2B shows cross-sectional views illustrating forming a conductive three-dimensional structure having an inverse shape of a porous template and forming an organic active layer on a surface of the conductive three-dimensional structure in a method for manufacturing a nano-network electrode according to an embodiment of the present invention.

FIG. 1 shows cross-sectional views illustrating a method for manufacturing a nano-network electrode according to an embodiment of the present invention. FIG. 2A shows schematic views illustrating forming a conductive three-dimensional structure having an inverse shape of a porous template and forming an organic active layer on a surface of the conductive three-dimensional structure in a method for manufacturing a nano-network electrode according to an embodiment of the present invention. FIG. 2B shows cross-sectional views illustrating forming a conductive three-dimensional structure having an inverse shape of a porous template and forming an organic active layer on a surface of the conductive three-dimensional structure in a method for manufacturing a nano-network electrode according to an embodiment of the present invention.

Referring to (a) of FIG. 1, a photoresist film is formed on a substrate.

The substrate may include a conductive layer 111 disposed on a base substrate 100. An adhesive layer 112 is formed on a base substrate 100. For example, the adhesive layer 112 may include an opening exposing the conductive layer 111 disposed thereunder. The photoresist film 120 is formed on the adhesive layer 112 and the conductive layer 111.

In an embodiment, the base substrate 100 may include a conductive material or a non-conductive material such as silicon, quartz, glass or the like. The conductive layer 111 may include titanium (Ti), gold (Au), aluminum (Al), nickel (Ni), indium tin oxide (ITO), fluorine-doped tin oxide (FTO) or a combination thereof. It may be preferable that the conductive layer 111 may consist of a material that may be easily removed by wet-etching.

The conductive layer 111 may have a proper thickness to uniformly and reliably function as a seed layer in an electroplating process. For example, the conductive layer 111 may have a thickness of 50 nm to 200 nm. In an embodiment, the conductive layer 111 may be a Ti layer having a thickness of about 150 nm and may be formed by E-beam evaporation.

The photoresist film 112 may be formed from a photoresist material. For example, the photoresist film 112 may be formed from a photoresist material same as a photo crosslinkable photoresist material used in a proximity-field nano-patterning (PnP) process, which is explained in the following. However, embodiments are not limited thereto, and the adhesive layer 112 may be formed from a different material from the material used in the PnP process.

For example, a first photoresist material including an epoxy-based material may be coated on the substrate through a spin coating process. The first photoresist material coated on the substrate 100 may be preliminarily heated (soft-baked), for example, at about 65° C. to about 95° C. Thereafter, the coated layer may be light-exposed with a portion, which corresponds to the opening, being masked, and then developed to remove the masked portion thereby forming the opening. The adhesive layer 112 having the opening may increase adhesion between the substrate and the photoresist film 120. Furthermore, after a three-dimensional template is formed, the conductive layer 111 may be partially exposed through the opening. Thus, the conductive layer 111 may function as a seed layer in an electroplating process.

Thereafter, a second photoresist photoresist material may be coated on the adhesive layer 112 and on an exposed upper surface of the conductive layer 111. The second photoresist material coated may be preliminarily heated, for example, at about 95° C. to form the photoresist film 120.

In an embodiment, a thickness of the adhesive layer 112 may be about 0.1 μm to about 10 μm. A thickness of the photoresist film 120 may be about 0.3 μm to about 1 mm, and may be preferably about 5 μm to about 100 μm.

Referring to (b) and (c) of FIG. 1, the photoresist film 120 is patterned to form an ordered three-dimensional porous polymer template 130.

According to an embodiment, the photoresist film 120 may be patterned by a PNP process that is an optical pattering process.

For example, a phase mask MK having a periodic lattice pattern is disposed to contact the photoresist film, and a light is irradiated onto the phase mask MK. A light passing through the phase mask MK is periodically three-dimensionally distributed by constructive interference and destructive interference. Thus, the photoresist film may be three-dimensionally exposed to a light. Thereafter, a developer is provided to the light-exposed photoresist film 120' to selectively a light-exposed portion or a non-light-exposed portion therefrom. As a result, the three-dimensional porous polymer template 130 may be obtained. According to an embodiment, the three-dimensional porous polymer template 130 may have a network structure wherein pores are three-dimensionally connected to each other with a periodicity of hundreds of nanometers to several micrometers.

In embodiment, a pore size and a periodicity of the three-dimensional porous polymer template 130 may be adjusted depending on a wavelength of the laser and a design and a pattern periodicity of the phase mask MK. Thus, a template having various pattern structures may be possible obtained.

More detailed explanation of the PnP method is disclosed in Proc. Natl. Acad. Sci. U.S.A. 2004, 101, 12428 and Korean Patent Publication 2006-0109477, which are incorporated herein for references.

Referring to FIG. 1 and FIGS. 2A and 2B, a conductive material is filled in interconnected pores of the three-dimensional porous polymer template 130 to form a composite 132. Thereafter, the three-dimensional porous polymer template 130 is removed to form a conductive three-dimensional structure 134.

In an embodiment, the conductive three-dimensional structure 134 may have an inverse shape of the three-dimensional porous polymer template 130, which is formed from entirely filling the pores in the three-dimensional porous polymer template 130, or may have a nano-shell shape surrounding the pores.

For example, the conductive material may be provided by various methods including plating, atomic layer deposition (ALD), a solution process or the like. In an embodiment, the conductive material may be provided by an electroplating process. In the electroplating process, the conductive layer 111 under the three-dimensional porous polymer template 130 may function as a cathode (working electrode). An electrolyte used in the electroplating process may include ions of a metal.

In the electroplating process, a voltage, a current, a process time or the like may be adjusted to change a filling ratio of the conductive material in the three-dimensional porous polymer template 130.

In an embodiment, the conductive three-dimensional structure 134 may include nickel. However, embodiments are not limited thereto. For example, the conductive three-dimensional structure 134 may include at least one of Ni, Cu, SUS (stainless steel), Ti, V, Cr, Mn, Fe, Co, Zn, Mo, W, Ag, Au, Ru, Pt, Ir, Al, Sn, Bi and Sb. In an embodiment, the conductive three-dimensional structure 134 includes a different material from the conductive layer 111.

A method of forming the conductive three-dimensional structure 134 in embodiments of the present invention is not limited to the electroplating process, and various methods may be used depending on a material and an application of an electrode. For example, a conductive three-dimensional structure including a metal nitride, a metal oxide or a conductive carbon material such as graphene, carbon nanotube or the like may be obtained by deposition, solution process or the like.

A shape of the conductive three-dimensional structure 134 in embodiments of the present invention is not limited to the inverse shape illustrated in FIGS. 2A and 2B. For example, the conductive three-dimensional structure 134 may be designed to have a nano-shell structure, in which a nano-shell unit surrounds a channel pore and a sub-pore is disposed between adjacent nano-shell units, by adjusting a filling ratio or a porosity thereof, and a thickness of the nano-shell structure may be adjusted. For example, a porosity of the conductive three-dimensional structure 134 may be adjusted by an electro-polishing process. The electro-polishing process may be performed by an inverse configuration of the electroplating process. For example, an electrolyte cell may be prepared such that the conductive three-dimensional structure 134 functions as an anode. When a high current density is inversely applied to the electrolyte cell, a metal component of the conductive three-dimensional structure 134 is ionized so that the conductive three-dimensional structure 134 is etched. As a result, the conductive three-dimensional structure 134 is etched to form a nano-shell structure or to adjust a porosity.

According to embodiments, the three-dimensional porous polymer template 130 may be removed by plasma treatment, heat treatment, wet-etching or the like.

Examples of the plasma treatment may include remote plasma treatment using microwave, oxygen plasma treatment, reactive ion etching (RIE) or the like The heat treatment may be performed at about 400° C. to about 1,000° C., for example, at an atmosphere including air or oxygen gas. Furthermore, inert gas such as argon (Ar) may be added to the atmosphere.

Referring to FIG. 1, after the three-dimensional porous polymer template 130 is removed, a film of the conductive three-dimensional structure 134 may be separated from the base substrate 100. For example, when the conductive three-dimensional structure 134 combined with the base substrate 100 is dipped in an etching solution including hydrofluoric acid, hydrochloric acid, potassium hydroxide or the like, the conductive layer 111 is dissolved so that the conductive three-dimensional structure 134 may be separated from the base substrate 100 to form a free-standing film. Titanium may be a proper material for a conductive sacrificial layer because titanium may be selectively removed with minimizing damage to the conductive three-dimensional structure 134, for example, in hydrofluoric acid solution. However, embodiments are not limited to using combination of hydrofluoric acid and titanium. Various metals and etchants may be selected to prevent damage to the conductive three-dimensional structure 134, and an order of processes may be properly adjusted.

Referring to FIGS. 1, 2A and 2B, an organic active material is provided on a surface of the conductive three-dimensional structure 134 to form a nano-network electrode 140 with an active layer 136 coated thereon.

The organic active material may include an organic compound having a redox (oxidation-reduction) center to have a redox activity. The term of "redox center" may refer a partial structure of the organic compound, which participate in redox reaction of an anode or a cathode when a secondary battery is charged or discharged.

Examples of the organic active material may include a heterocyclic compound having at least one six-atoms ring or five-atoms ring, which include at least one of carbon, oxygen, nitrogen and sulfur.

At least one hydrogen atom of the heterocyclic compound may be replaced with at least one substituent selected from an alkyl group, an alkoxyl group, a hydroxyl group, a carbonyl group, a cyan group, an amine group, a halogen atom and a halogenated alkyl group.

Examples of the organic active material may include organic compounds having a structure of conjugated hydrocarbon, conjugated amine, conjugated thioether, organodisulfide, thioether, nitroxyl radical or conjugated carbonyl, and derivatives thereof.

The organic active material may be provided by various methods depending on materials such that the organic active material does not block a porous network and does not change physical and electrochemical characteristics of components, such as electron diffusivity of a current collector.

In an embodiment, the organic active material may include a polyimide (imide-based compound), which has a redox center of a carbonyl group (C=O). In an embodiment, the polyimide may be represented by the following Chemical Formula 1.

[Chemical Formula 1]

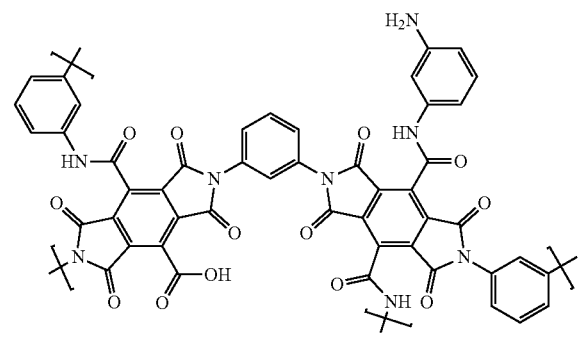

The polyimide may allow redox reactions with multi-electrons thereby achieving a secondary battery having remarkably increased capacity.

In an embodiment, organic monomers may be provided in pores of the conductive three-dimensional structure 134, and the polymer reactive material may be synthesized from reaction of the monomers. For example, the polyimide represented by Chemical Formula 1 may be synthesized from condensation reaction of mellitic acid and m-phenylenediamine (1,3-benzendiamine). For example, a solution of mellitic acid and m-phenylenediamine may be filled in the pores of the conductive three-dimensional structure 134, and condensation reaction thereof may be induced at about 180° C. to form the active layer 136 uniformly coated in the conductive three-dimensional structure 134.

However, embodiments are not limited thereto. Various conventional organic active materials may be coated by various conventional coating methods.

For example, the organic active material may include a phenazine derivative having a redox center of —N—C═C—N—. For example, the phenazine derivative may be represented by the following Chemical Formula 2.

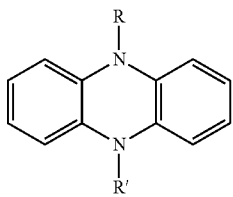

[Chemical Formula 2]

In Chemical Formula 2, R and R' independently represent at least one of an alkyl group of C1 to C5, an alkenyl group of C2 to C5, an aliphatic ring group of C3 to C30, an aromatic ring group of C6 to C30 and a heterocyclic group including at least one heteroatom of oxygen, nitrogen and sulfur.

In an embodiment, the phenazine derivative may be 5,10-dihydro-5,10-dimethylphenazine (DMPZ), which R and R' each represent methyl group in Chemical Formula 2.

The phenazine derivative may allow redox reactions with multi-electrons thereby achieving a secondary battery having remarkably increased capacity.

In an embodiment, the nano-network electrode 140 may have pores that are ordered and connected to each other. A size (width) of the pores may be equal to or less than about 1 μm. Thus, the nano-network electrode 140 may have a high electric conductivity and a high ionic conductivity. Furthermore, an amount of the organic active material loaded in the nano-network electrode 140 may be increased thereby improving performance of a secondary battery including the electrode.

Figure 3A:
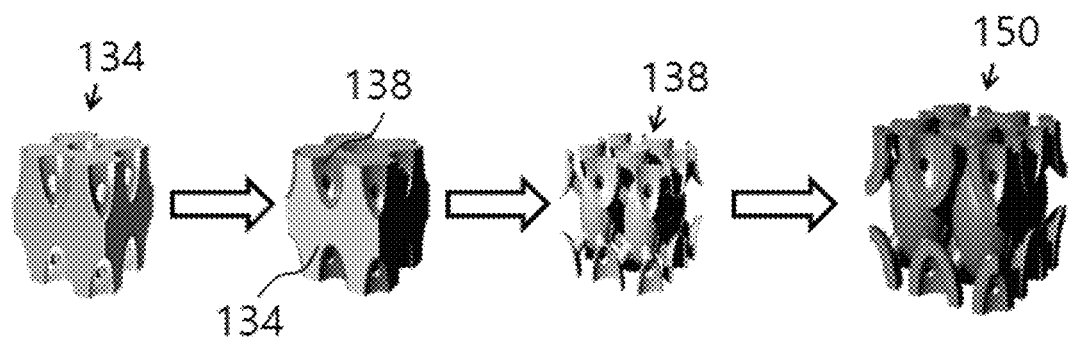
FIG. 3A shows schematic views illustrating forming a conductive nano-shell structure by using a conductive three-dimensional structure as a secondary template and forming an organic active layer on a surface of the conductive three-dimensional structure in a method for manufacturing a nano-network electrode according to an embodiment of the present invention.
Figure 3B:
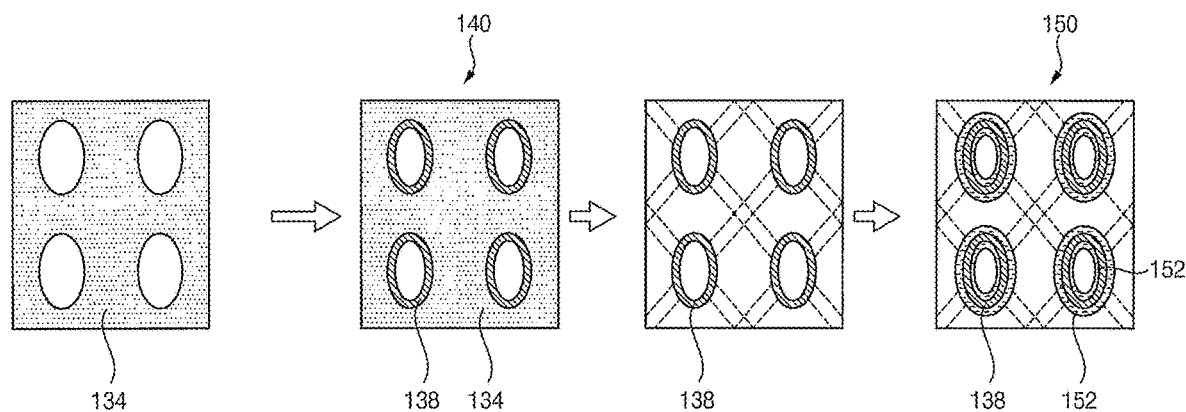
FIG. 3B shows cross-sectional views illustrating forming a conductive nano-shell structure by using a conductive three-dimensional structure as a secondary template and forming an organic active layer on a surface of the conductive three-dimensional structure in a method for manufacturing a nano-network electrode according to an embodiment of the present invention.

FIG. 3A shows schematic views illustrating forming a conductive nano-shell structure by using a conductive three-dimensional structure as a secondary template and forming an organic active layer on a surface of the conductive three-dimensional structure in a method for manufacturing a nano-network electrode according to an embodiment of the present invention. FIG. 3B shows cross-sectional views illustrating forming a conductive nano-shell structure by using a conductive three-dimensional structure as a secondary template and forming an organic active layer on a surface of the conductive three-dimensional structure in a method for manufacturing a nano-network electrode according to an embodiment of the present invention.

Referring to FIGS. 3A and 3B, a conductive ceramic material is deposited on a surface of the conductive three-dimensional structure 134 having the inverse shape through ALD at a high temperature. The conductive three-dimensional structure 134 is removed to form a conductive nano-shell structure 138.

For example, the conductive ceramic material may include titanium nitride (TiN), zinc oxide (ZnO), indium oxide ($In_2O_3$), aluminum-doped zinc oxide (AZO) or a combination thereof.

When the ALD is performed, a process time and a process temperature may be adjusted to change a filling ratio of the conductive ceramic material so that a shell thickness of the conductive nano-shell structure 138 may be adjusted.

In an embodiment, the conductive nano-shell structure 138 may have a porosity of about 40% to about 95%. For example, a shell thickness (a deposition thickness) of the conductive nano-shell structure 138 may be about 20 nm to about 200 nm, which may be proper for a secondary battery.

A method for providing an organic active material on a surface of the conductive nano-shell structure 138 to form an active layer 152 and a nano-network electrode 150 may be substantially same as those previously explained with reference to FIGS. 2A and 2B.

Accordingly, a nano-network electrode, in which the conductive nano-shell structure 138 is interposed between active layers 152. Furthermore, using the conductive three-dimensional structure as a secondary template may allow the conductive nano-shell structure 138 to be formed by a high-temperature ALD process.

Referring to FIGS. 3A and 3B, the nano-network electrode 150 may have the conductive nano-shell structure 138 interposed (sandwiched) between the active layers 152. The sandwiched electrode structure may have a large surface, and electrons may move quickly along a network of the conductive nano-shell structure 138. Furthermore, resistance of ions diffusing along the active layers 152 may be reduced. Thus, a secondary battery including the nano-network electrode 150 may be quickly charged and discharged.

For example, a thickness of the nano-network electrode 150 may be about 0.3 μm to about 1 mm. The thickness may be defined along a shorter axis for a material or a particle. For example, the thickness of the electrode may be defined along a moving direction of charges, it may be perpendicular to a plane of a film. For example, an amount of the organic active material in a unit area of the nano-network electrode 150 may be about 0.1 mg/cm$^2$ to about 30 mg/cm$^2$ on the plane which is perpendicular to the thickness direction. Preferably, a thickness of the nano-network electrode 150 may be about 5 μm to about 30 μm, and an amount of the organic active material may be about 2 mg/cm$^2$ to about 10 mg/cm$^2$. More preferably, a thickness of the nano-network electrode 150 may be about 5 μm to about 15 μm, and an amount of the organic active material may be about 2 mg/cm$^2$ to about 5 mg/cm$^2$. Furthermore, an amount of the organic active material may be about 30 wt % to about 60 wt % based on a total weight of the nano-network electrode 150, and may be preferably 45 wt % to about 55 wt %. When an amount of the organic active material is too small, a solid electrolyte interface that is necessary to improve long-term durability of a secondary battery may not be sufficiently formed. When an amount of the organic active material is too large, micro-particles may be formed on an electrode surface thereby reducing electric conductivity, and irregular aggregation of the particles may reduce electric conductivity and ionic conductivity. Furthermore, when a thickness of the nano-network electrode 150 is too large, uniformity of pores and electric conductivity may be reduced.

The organic active material has a relatively low intrinsic electric conductivity with compared to an inorganic active material. Thus, when a thickness of an organic active layer is increased, charge mobility of an electrode may be reduced, and an electrode may be easily mechanically deteriorated. Thus, it may be difficult to increase an amount of the organic active material and an energy density of a secondary battery including the organic active material.

The nano-network electrode according to an embodiment includes a three-dimensional organic active layer on an ordered conductive three-dimensional structure, in which electrons may quickly and continuously move. Thus, electrons may be easily transferred to the organic active layer, and ionic conductivity may be increased. Thus, an amount of an organic active material loaded in an electrode may be increased thereby increasing an energy density.

Furthermore, because the conductive three-dimensional structure can function as a current collector, a conventional solid metal collector may be omitted. Thus, a weight of a battery may be reduced thereby increasing an energy density.

Figure 4:
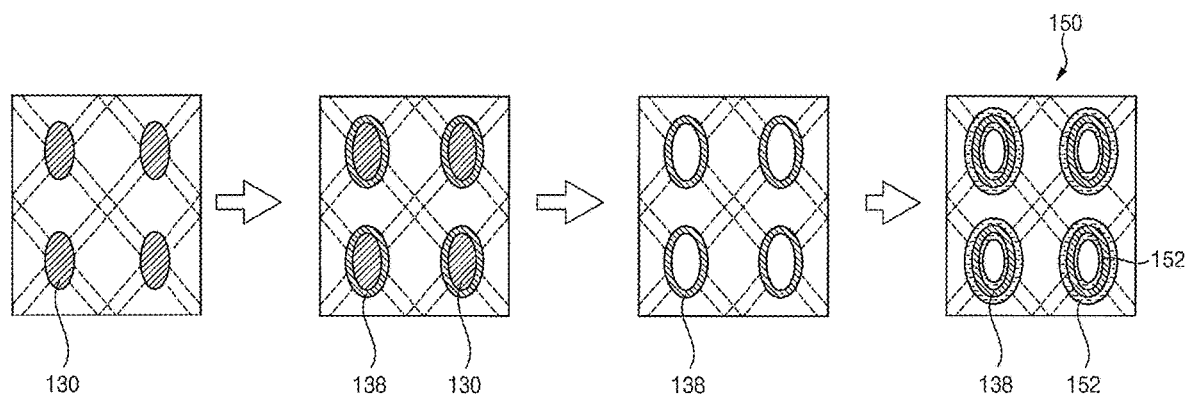
FIG. 4 shows cross-sectional views illustrating forming a conductive nano-shell structure from a porous polymer template and forming an organic active layer on a surface of the conductive three-dimensional structure in a method for manufacturing a nano-network electrode according to an embodiment of the present invention.

FIG. 4 shows cross-sectional views illustrating forming a conductive nano-shell structure from a porous polymer template and forming an organic active layer on a surface of the conductive three-dimensional structure in a method for manufacturing a nano-network electrode according to an embodiment of the present invention.

Referring to FIG. 4, a conductive ceramic material is deposited on a surface of a three-dimensional porous polymer template 130. Thereafter, the three-dimensional porous polymer template 130 is removed to form a conductive nano-shell structure 138.

Thereafter, an organic active material is provided on a surface of the conductive nano-shell structure 138 to form an active layer 152 and a nano-network electrode 150. A method for forming the active layer 152 may be substantially same as those previously explained with reference to FIGS. 2A and 2B.

In an embodiment, the nano-shell structure 138 may be formed by using the three-dimensional porous polymer template 130 as a template without using a secondary template. Thus, the nano-shell structure 138 may be formed by less processes. In an embodiment, in order to prevent heat damage to the three-dimensional porous polymer template 130 in a deposition process, an ALD process for the conductive ceramic material may be performed at a low temperature, for example, at less than 100° C.

Figure 5:
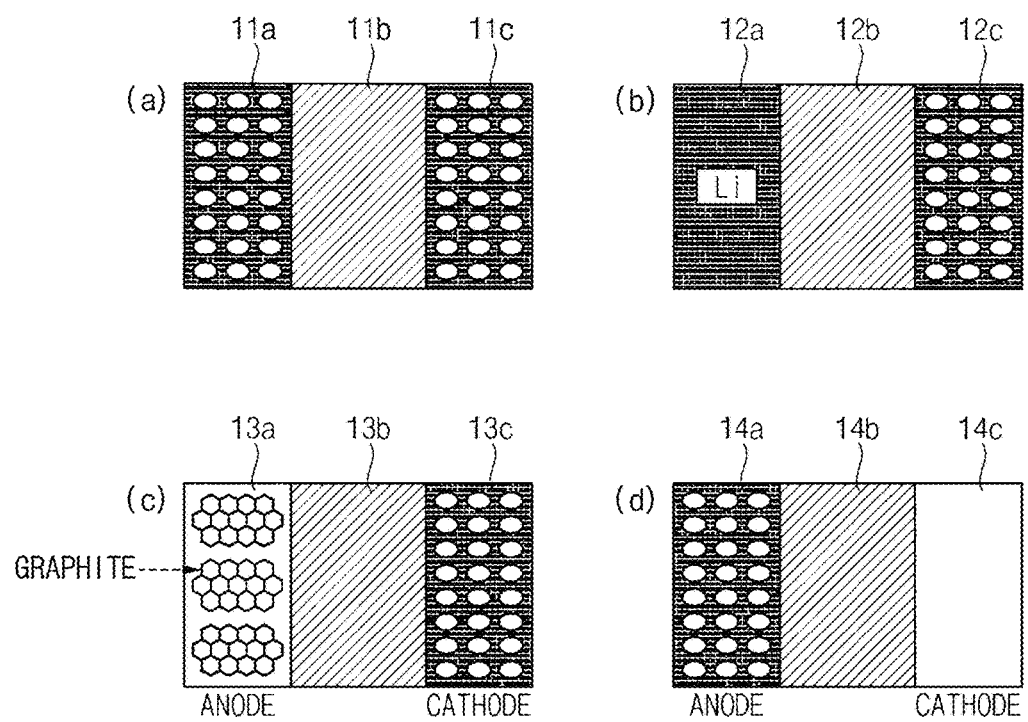
FIG. 5 shows schematic views illustrating secondary batteries including a nano-network electrode according to embodiments of the present invention.

FIG. 5 shows schematic views illustrating secondary batteries including a nano-network electrode according to embodiments of the present invention.

A nano-network electrode according to an embodiment may have a high conductivity and mechanical stability. Thus, the nano-network electrode may be used for an electrode of a lithium ion battery without an additional collector. However, embodiments are not limited thereto. For example, the nano-network electrode may be combined with a collector to be used for an electrode.

Referring to (a) of FIG. 5, a lithium ion battery according to an embodiment may be an organic secondary battery in which both of a cathode 11c and an anode 11a are a nano-network electrode having an organic active layer.

Referring to (b) of FIG. 5, a lithium ion battery according to an embodiment may be a half cell battery in which a reference electrode 12a includes lithium and a counter electrode 12c includes a nano-network electrode.

Referring to (c) of FIG. 5, a lithium ion battery according to an embodiment may be a full cell battery in which a cathode 13c includes a nano-network electrode. For example, an anode 13a may include a silicon-based anode material, a carbon-based anode material such as graphite, or the like.

Referring to (d) of FIG. 5, a lithium ion battery according to an embodiment may be a full cell battery in which an anode 14a includes a nano-network electrode. For example, a cathode 14a may include a lithium transition metal oxide. For example, the lithium transition metal oxide may include lithium cobalt oxide, lithium nickel oxide, lithium manganese oxide, lithium titanium oxide, lithium iron oxide or a combination thereof. Particularly, the lithium transition metal oxide may include $LiCoO_2$, $LiNiO_2$, $LiNi_{1-x}Co_xO_2$, $LiFePO_4$, $LiMnO_2$, $LiMn_2O_4$, $Li_2Mn_3NiO_8$, $LiNi_xCo_yMn_zO_2$, $LiNi_xCo_yAl_zO_2$ (x+y+z=1), $Li_4Ti_5O_{12}$, $Li_2FeSiO_4$ or a combination thereof.

The above secondary batteries may include a separator 11b, 12b, 13b and 14b separating the electrodes from each other, and an electrolyte for transferring ions to the electrodes.

The separator may prevent electrical contact of the electrodes. For example, the separator may include a porous polymer film or a stacked structure thereof. The porous polymer film may include a polyolefin polymer such as polyethylene, polypropylene, ethylene/butene copolymer, ethylene/hexene copolymer, ethylene/methacrylate copolymer or the like. However, example embodiments of the present invention are not limited thereto. For example, the separator may include a glass fiber with a high melting point, a non-woven fabric including polyethylene terephthalate or the like.

The electrolyte may include a liquid electrolyte or a solid electrolyte.

For example, the liquid electrolyte may include propylene carbonate (PC), ethylene carbonate (EC), diethyl carbonate (DEC), dimethyl carbonate (DMC), dipropyl carbonate (DPC), dimethyl sulfoxide, acetonitrile, dimethoxy ethane, diethoxy ethane, tetrahydrofuran, N-methyl-2-pyrollidone (NMP), ethylmethyl carbonate (EMC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, propyl propionate, butyl propionate or a combination thereof. Furthermore, the electrolyte may further include a lithium salt. An anion of the lithium salt may include $F^-$, $Cl^-$, $Br^-$, $I^-$, $NO_3^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$ or a combination thereof.

The solid electrolyte may include a polymer gel electrolyte or an inorganic solid electrolyte including sulfate or halogenated.

In order to have a configuration proper for a battery, a plurality of nano-network electrodes may be stacked, or at least one nano-network electrode may be folded or rolled.

Embodiments are not limited to a lithium ion battery. For example, embodiments may include a lithium sulfur battery, a sodium ion battery, a magnesium ion battery, a lithium polymer battery or the like.

Hereinafter, performances and manufacturing methods of electrodes according embodiments will be explained with reference to following examples. However, the following will be understood to be examples, and embodiments of the invention are not limited thereto.

Example 1: Manufacturing Polyimide-Nickel Nano-Network Composite Electrode and a Battery 1) Manufacturing Three-Dimensional Porous Polymer Template by Using PnP Method Titanium was deposited with a thickness of 150 nm by 0.5 Å/s on an $SiO_2$/Si substrate. A photoresist composition (trade name: SU-8 2, manufactured by Micro Chem) was spin-coated thereon, for 30 seconds by 3,000 rpm, and heated on a hot plate at 65° C. for 2 minutes and at 95° C. for 3 minutes to form a coated layer. Thereafter, a chrome mask was disposed on the coated layer, and the coated layer was exposed to a UV lamp of 365 nm for 1 minute and heated at 95° C. for 5 minutes to cross-link the photoresist composition unmasked by the chrome mask. Thereafter, a developer was provided to the coated layer to remove a portion, which was not light-exposed, thereby forming a two-dimensional pattern having an opening. A photoresist composition (SU-8 10) was spin-coated for 30 seconds by 2,000 rpm, and heated on a hot plate at 65° C. for 30 minutes and at 95° C. for 60 minutes to form a photoresist film.

A phase mask formed of PDMS and having a convexo-concave surface with a periodically arranged rectangular lattice was disposed to contact the photoresist film. The phase mask included nano-pillars with a height of 420 nm, which were arranged in a square array with a periodicity (pitch) of 600 nm. A laser having a wavelength of 365 nm was irradiated to the photoresist film through the phase mask with about 9.5 mJ to about 10.3 mJ, and developed and dried to form a three-dimensional porous polymer template having pores (channels) network periodically arranged along X axis, Y axis and Z axis.

2) Forming Inverse-Shaped Three-Dimensional Nickel Structure by Electroplating

The three-dimensional porous polymer template was treated by oxygen plasma for 2 minutes. Thereafter, an electroplating process was performed with a pulse having about 2 $mA/cm^2$ with a period of 5 seconds for 4 hours such that nickel was filled in the three-dimensional porous polymer template until a thickness of about 6.3 μm. Thereafter, the three-dimensional porous polymer template was removed by remote plasma treatment using $O_2$, $N_2$ and $CF_2$ to form a three-dimensional nickel structure having an inverse shape of the three-dimensional porous polymer template. The substrate having the three-dimensional nickel structure was dipped in a hydrofluoric acid solution of 10% by volume to selectively dissolve a titanium layer. Accordingly, a three-dimensional nickel film having been separated from the substrate was obtained.

3) Forming a Polyimide Active Layer

The three-dimensional nickel film was put in a Teflon chamber, and a water solution including mellitic acid and 1,3-benzenediamine dissolved with a same weight ratio with a total concentration of 10 mg/mL therein was put in the chamber such that the three-dimensional nickel film was entirely dipped to assemble a hydrothermal reactor. The hydrothermal reactor was put in a furnace, and heated by 180° C. with a speed of 1.3° C./minute, and condensation polymerization reaction was performed for 3 hours so that a polyimide-based polymer active layer was coated on a surface of the three-dimensional nickel film. Thereafter, rinsing with distilled water and ethanol and drying are performed to obtain a three-dimensional polyimide-nickel nano-network composite electrode. An amount of an organic active layer in the nano-network composite electrode was measured to be about 52 wt %.

4) Fabricating Lithium Ion Battery

A coin-typed battery (CR2032) was assembled from the nano-network composite electrode, a lithium foil (Hoshen, Japan) electrode and a polymer separator (Celgard 2400) in an inert atmosphere by Ar gas filled in a glove box. An electrolyte solution including ethylene carbonate, dimethyl carbonate and 1M of $LiPF_6$ was used for an electrolyte.

Example 2: Manufacturing Low-Loading Three-Dimensional Composite Electrode and a Battery An electrode and a battery was prepared by a substantially same method as Example 1 except that a total concentration of a solution including mellitic acid and 1,3-benzenediamine was 4 mg/mL. An amount of an organic active material in the obtained composite electrode was measured to be about 24 wt %.

Example 3: Manufacturing High-Loading Three-Dimensional Composite Electrode and a Battery An electrode and a battery was prepared by a substantially same method as Example 1 except that a total concentration of a solution including mellitic acid and 1,3-benzenediamine was 40 mg/mL. An amount of an organic active material in the obtained composite electrode was measured to be about 56 wt %.

Example 4: Manufacturing Thick Three-Dimensional Composite Electrode and a Battery An electrode and a battery was prepared by a substantially same method as Example 1 except that a filling thickness of nickel was adjusted such that a three-dimensional nickel film had a thickness of about 19 μm.

Comparative Example 1: Manufacturing Powder-Based Polyimide Electrode and a Battery A water solution including mellitic acid and 1,3-benzenediamine dissolved with a same weight ratio with a total concentration of 10 mg/mL therein was put in a Teflon chamber, and hydrothermal synthesis was performed by a substantially same method as Example 1. Thus obtained polyimide active material was dried to form a powder.

The polyimide active material power, a conductive additive (Super P carbon) and a binder (polytetrafluoroethylene) were mixed with each other with a weight ratio of 40:40:20 to form an electrode.

A battery was prepared by using the electrode and by a substantially same method as Example 1.

Figure 6A:
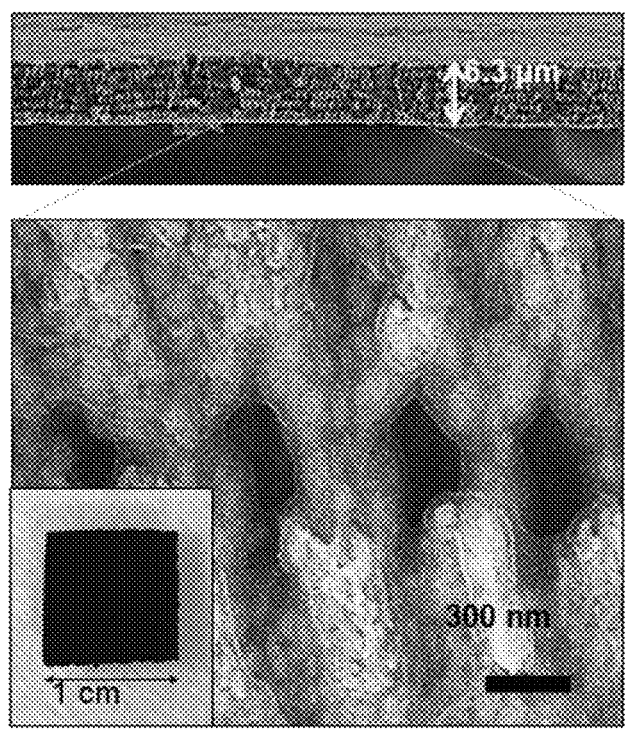
FIG. 6A shows a scanning electron microscopy (SEM) image (lower image) and a digital picture (upper image) of the nano-network electrode of Example 1.
Figure 6B:
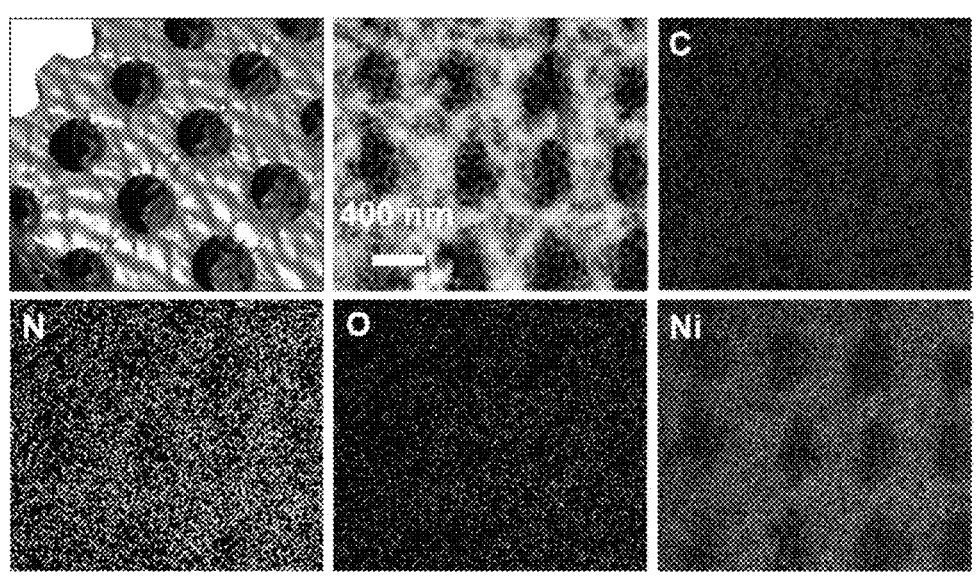
FIG. 6B is an energy-dispersive X-ray spectroscopy (EDS) mapping image of the nano-network electrode of Example 1.

FIG. 6A shows a scanning electron microscopy (SEM) image (lower image) and a digital picture (upper image) of the nano-network electrode of Example 1. FIG. 6B is an energy-dispersive X-ray spectroscopy (EDS) mapping image of the nano-network electrode of Example 1.

Referring to FIGS. 6A and 6B, the nano-network electrode of Example 1 had a uniform array of pores having a width of about 300 nm, and a thickness of about 6.3 μm. Furthermore, it can be noted that an organic active material was uniformly coated on a surface of the nickel structure. Furthermore, the organic active material formed aggregation having a sphere shape with a diameter equal to or less than 100 nm on the surface of the nickel structure.

Figure 7A:
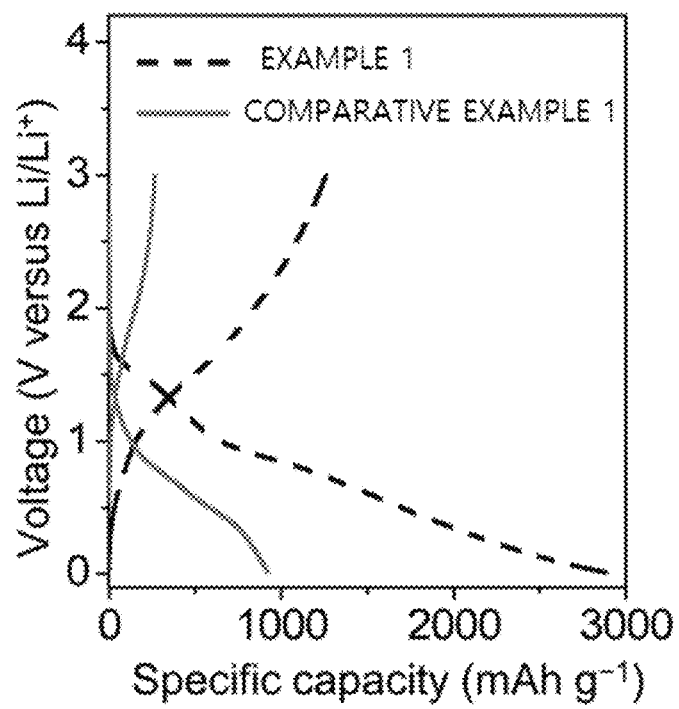
FIG. 7A is a graph illustrating charge/discharge voltage profile of the batteries of Example 1 and Comparative Example 1 in a first cycle.
Figure 7B:
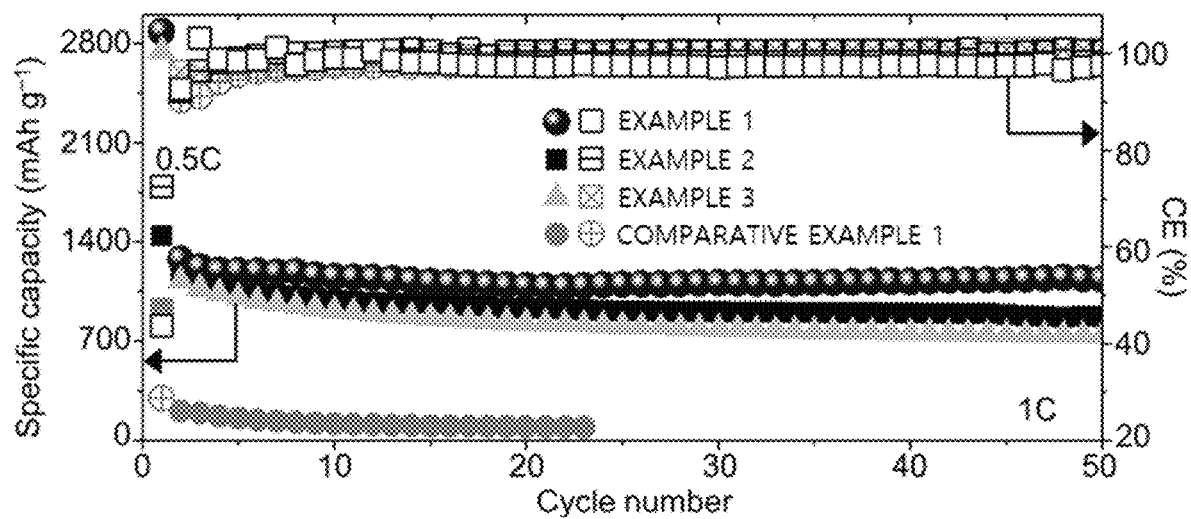
FIG. 7B is a graph illustrating specific capacities and Coulomb efficiency (CE, charge capacity/discharge capacity) of the batteries of Example 1 to 3 and Comparative Example 1.

FIG. 7 shows graphs illustrating charge/discharge voltage profiles and cycle characteristics of the batteries of Example 1 to 3 and Comparative Example 1. FIG. 7A is a graph illustrating charge/discharge voltage profile of the batteries of Example 1 and Comparative Example 1 in a first cycle. FIG. 7B is a graph illustrating specific capacities and Coulomb efficiency (CE, charge capacity/discharge capacity) of the batteries of Example 1 to 3 and Comparative Example 1. Particularly, the charge/discharge voltage profiles and the cycle characteristics were measured in 0.01 V to 3 V with 0.5 C (750 mA/g) in a first cycle and with 1 C (1,500 mA/g) in a second cycle and in next cycles.

Referring to FIG. 7A, the battery of Example 1 achieved a high initial discharging capacity, which was 2,880 mAh/g in the first cycle. Thus, it can be noted that electrochemical activity was maximized by improvement of electric conductivity and ionic conductivity.

Referring to FIG. 7B, the battery of Example 1 achieved a reversible capacity of 1,260 mAh/g, which was much larger than 266 mAh/g that was a reversible capacity of Comparative Example 1. Furthermore, it can be noted that the battery of Example 1 achieved a reversible capacity larger than those of batteries of Example 2 (low-loading composite electrode) and Example 3 (high-loading composite electrode).

Figure 8:
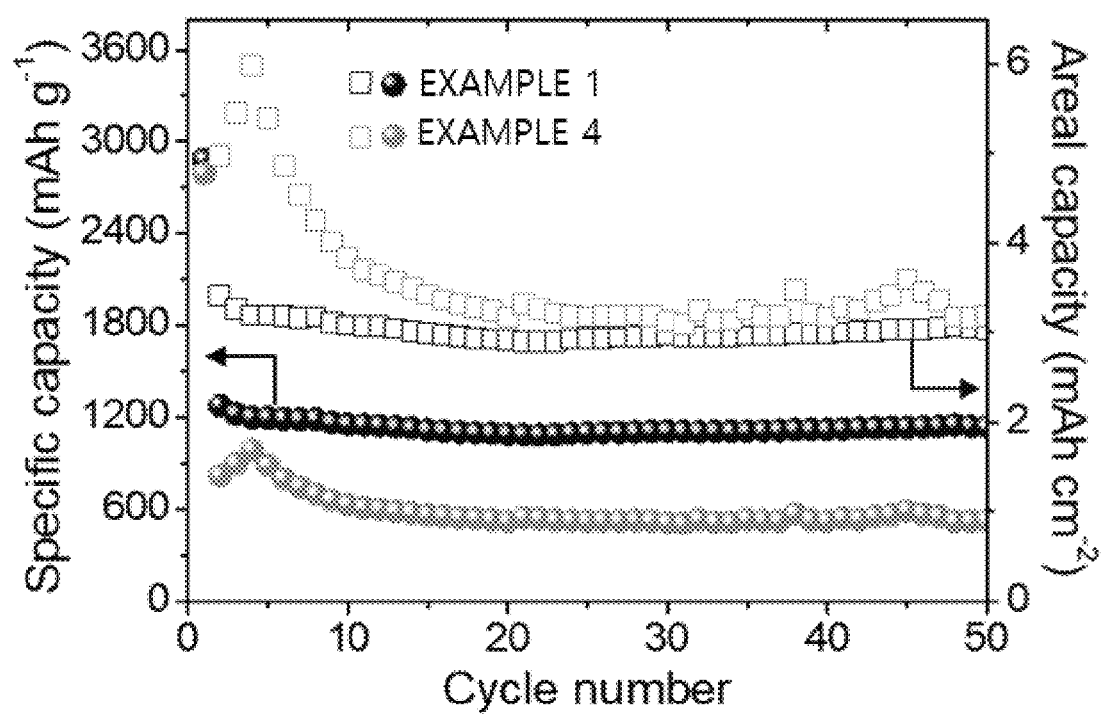
FIG. 8 is shows a graph illustrating specific capacity and areal capacity of the batteries of Example 1 (thickness: 6.3 μm, loading amount of active material: 2.9 mg/cm$^2$) and Example 4 (thickness: 19 μm, loading amount of active material: 6.1 mg/cm$^2$).

FIG. 8 is shows a graph illustrating specific capacity and areal capacity of the batteries of Example 1 (thickness: 6.3 μm, loading amount of active material: 2.9 mg/cm$^2$) and Example 4 (thickness: 19 μm, loading amount of active material: 6.1 mg/cm$_2$). Particularly, the specific capacity and the areal capacity were measured in 0.01 V to 3 V with 0.5 C (750 mA/g) in a first cycle and with 1 C (1,500 mA/g) in a second cycle and in next cycles.

Referring to FIG. 8, when a thickness of the composite electrode was too large, the specific capacity of the battery was reduced even though the areal capacity and the loading amount of active material were increased.

Figure 9A:
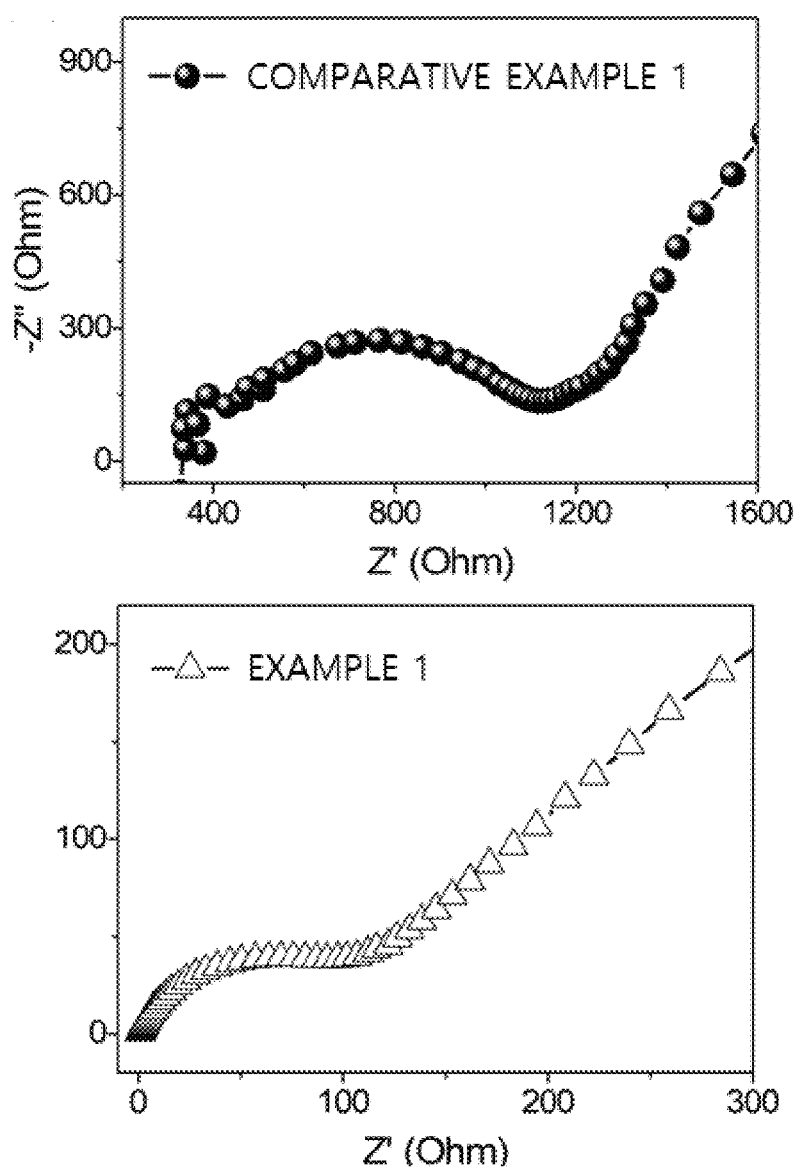
FIG. 9A shows graphs illustrating electrochemical impedance spectroscopy (EIS) spectrums of the batteries of Example 1 and Comparative Example 1.
Figure 9B:
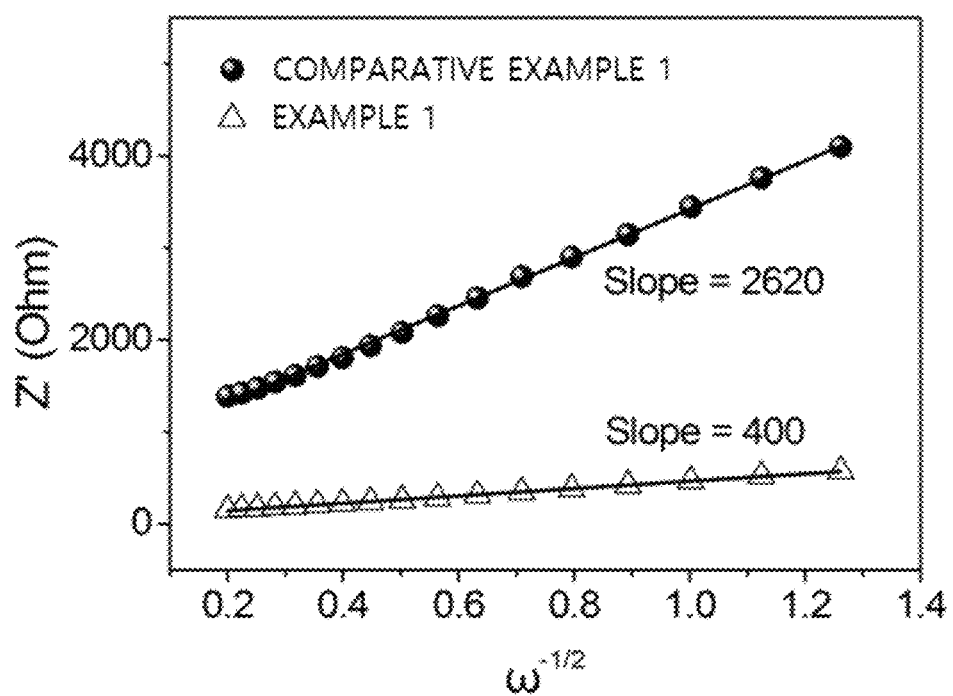
FIG. 9B shows graphs illustrating Warburg coefficients of the batteries of Example 1 and Comparative Example 1.

FIG. 9A shows graphs illustrating electrochemical impedance spectroscopy (EIS) spectrums of the batteries of Example 1 and Comparative Example 1. FIG. 9B shows graphs illustrating Warburg coefficients of the batteries of Example 1 and Comparative Example 1. Impedances were measured with a frequency of 10 kHz to 0.01 Hz after the batteries were fully charged, and Warburg coefficients were obtained from the impedances.

Referring to FIG. 9A, charge transfer resistance of the battery of Example 1 was much lower than that of the battery of Comparative Example 1, and it can be noted that the composite electrode of Example 1 has kinetics characteristics improved by high electric conductivity and ionic conductivity of an ordered porous network structure.

Referring to FIG. 9B, a lithium ion diffusion coefficient of Example 1, which was calculated from the Warburg coefficients showing ion diffusion ability in an electrode, was 43 times larger than that of Comparative Example 1.

Ordered three-dimensional porous nano-network electrodes according to embodiments may be used for various energy-storing devices using an organic material as an active material. For example, ordered three-dimensional porous nano-network electrodes according to embodiments may be used for a lithium secondary battery.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An ordered porous nano-network electrode comprising:
   A conductive three-dimensional structure having ordered and interconnected pores; and
   an active layer disposed on a surface of the conductive three-dimensional structure to surround the pores and including an organic active material having a redox center,
   wherein an amount of the organic active material in a unit area is 0.1 mg/cm$^2$ to 30 mg/cm$^2$,
   wherein the conductive three-dimensional structure includes at least one of Ni, Cu, SUS (stainless steel), Ti, V, Cr, Mn, Fe, Co, Zn, Mo, W, Ag, Au, Ru, Pt, Ir, Al, Sn, Bi, Sb, titanium nitride (TiN), zinc oxide (ZnO), indium oxide (In2O3) and aluminum-doped zinc oxide (AZO).

2. The ordered porous nano-network electrode of claim 1, wherein the conductive three-dimensional structure has a porosity of 40% to about 95% and a nano-shell shape with a shell thickness of 20 nm to 200 nm, and is sandwiched between adjacent active layers.

3. The ordered porous nano-network electrode of claim 1, wherein the organic active material includes a heterocyclic compound having at least one six-atoms ring or five-atoms ring, which includes at least one of carbon, oxygen, nitrogen and sulfur.

4. The ordered porous nano-network electrode of claim 3, wherein at least one hydrogen atom of the heterocyclic compound is replaced with at least one substituent selected from an alkyl group, an alkoxyl group, a hydroxyl group, a carbonyl group, a cyan group, an amine group, a halogen atom and a halogenated alkyl group.

5. The ordered porous nano-network electrode of claim 1, wherein a thickness of the conductive three-dimensional structure is 5 μm to 15 μm, and an amount of the organic active material in a unit area is 2 mg/cm$^2$ to 5 mg/cm$^2$.

6. The ordered porous nano-network electrode of claim 1, wherein an amount of the organic active material is 45 wt % to 55 wt % based on a total weight of the nano-network electrode.

7. A method of manufacturing an ordered porous nano-network electrode, the method comprising:
   forming a three-dimensional porous polymer template having ordered and interconnected pores on a substrate;
   providing a conductive material in the pores of the three-dimensional porous polymer template;
   removing the three-dimensional porous polymer template to form a conductive three-dimensional structure having an inverse shape of the three-dimensional porous polymer template, which is formed from filling the pores, or a nano-shell structure;
   removing the substrate from the conductive three-dimensional structure; and
   forming an active layer on a surface of the conductive three-dimensional structure, the active layer including an organic active material having a redox center.

8. The method of claim 7, wherein the substrate includes a conductive layer,
wherein providing the conductive material in the pores of the three-dimensional porous polymer template is performed by electroplating using the conductive layer as an electrode or by atomic layer deposition.

9. The method of claim 7, wherein forming the active layer includes:
providing organic monomers in the pores; and
synthesizing a polymer active material from reaction of the organic monomers.

10. The method of claim 7, wherein the conductive three-dimensional structure has the inverse shape of the three-dimensional porous polymer template,
wherein the method further comprising changing a porosity of the conductive three-dimensional structure by electro-polishing.

11. The method of claim 7, wherein forming the conductive three-dimensional structure includes:
removing the three-dimensional porous polymer template to form an inverse structure of the three-dimensional porous polymer template;
forming a nano-shell structure including a conductive ceramic by using the inverse structure as a template; and
removing the inverse structure.

12. The method of claim 7, wherein the conductive material includes a conductive ceramic, wherein providing the conductive material in the pores of the three-dimensional porous polymer template is performed by atomic layer deposition at a temperature less than 100° C.

13. A secondary battery comprising:
a first electrode including the ordered porous nano-network electrode of claim 1;
a second electrode separated from the first electrode by a separator; and
an electrolyte transferring ions between the first electrode and the second electrode.

14. The secondary battery of claim 13, wherein the second electrode includes an ordered porous nano-network electrode substantially same as that of the first electrode.

* * * * *